(12) United States Patent
Hou et al.

(10) Patent No.: US 8,803,357 B2
(45) Date of Patent: Aug. 12, 2014

(54) POWER SUPPLY SYSTEM FOR RACK SERVER

(75) Inventors: Kuei-Chih Hou, Tu-Cheng (TW); Yu-Chi Tsai, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 799 days.

(21) Appl. No.: 13/027,280

(22) Filed: Feb. 15, 2011

(65) Prior Publication Data
US 2012/0169118 A1 Jul. 5, 2012

(30) Foreign Application Priority Data
Dec. 29, 2010 (TW) .................................. 99146511

(51) Int. Cl.
*H02J 1/10* (2006.01)
*H02J 3/38* (2006.01)
*H02J 7/34* (2006.01)

(52) U.S. Cl.
USPC ............................................ 307/18

(58) Field of Classification Search
USPC .......................................... 307/12, 18, 19, 45
See application file for complete search history.

(56) References Cited

U.S. PATENT DOCUMENTS

2004/0003306 A1 * 1/2004 Oomori .......................... 713/300

* cited by examiner

*Primary Examiner* — Carlos Amaya
(74) *Attorney, Agent, or Firm* — Novak Druce Connolly Bove + Quigg LLP

(57) ABSTRACT

A power supply system is for supplying power to a number of loads, and includes a number of plugs, a number of power supply modules of the same type, and a number of current distribution modules. The plugs are respectively used for connecting to an external power source, to obtain alternating current. The power supply modules are connected to the respective plugs for converting the alternating current into direct current and providing the direct current to the loads according to the requirements of the loads. Each power supply module includes a positive electrode and a negative electrode, both of which connect to a corresponding load. The current distribution module electrically connects the positive electrodes to each other, and electrically connects the negative electrodes to each other, such that the power supply modules are connected in parallel.

11 Claims, 3 Drawing Sheets

POWER SUPPLY SYSTEM FOR RACK SERVER

BACKGROUND

1. Technical Field

The present disclosure relates to power supply systems and, particularly, to a power supply system typically used in a rack server.

2. Description of Related Art

Rack servers include a power supply system supplying electrical power to a number of loads (e.g., blade servers). In order to ensure that the loads are always working under normal conditions, the power supply system employs a main power supply and a redundant power supply for each load. However, this arrangement increases the cost of the power supply system.

Therefore, it is desirable to provide a power supply system that can overcome the described limitations.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present power supply system. Moreover, in the drawings, like reference numerals designate corresponding parts throughout the views.

DETAILED DESCRIPTION

Figure 1:
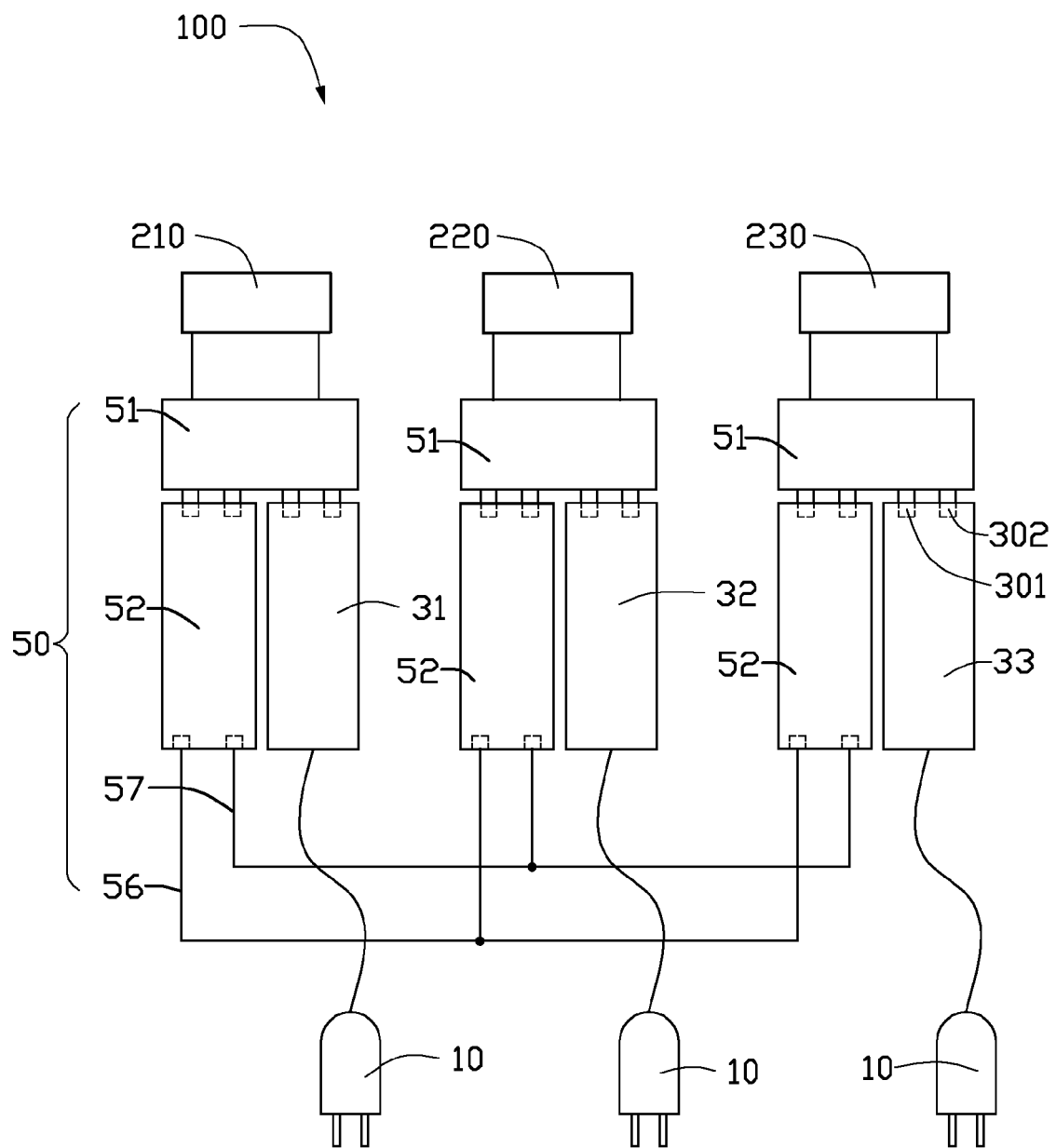
FIG. 1 is a schematic view of a power supply system, according to an exemplary embodiment.

Referring to FIG. 1, a power supply system 100 for a rack server, according to an exemplary embodiment, is used for supplying electrical power to three loads (i.e. blade servers). The power supply system 100 includes three plugs 10, three power supply modules, and a current distribution module 50. Each power supply module and each plug 10 corresponding to one load. The number of loads, plugs 10 and power supply modules may be varied according to need, and are not limited to those described for this embodiment.

The three loads include a first load 210, a second load 220, and a third load 230. The three power supply modules include a first power supply module 31, a second power supply module 32, and a third power supply module 33.

The three plugs 10 are used for respectively connecting to an external alternating current power source (not shown), to obtain an alternating current.

The three power supply modules 31, 32, 33 are electrically connected to the respective plugs 10. The three power supply modules 31, 32, 33 are used for transforming the alternating current to a direct current, and providing the direct current to the three loads 210, 220, 230 respectively according to the requirements of the three loads 210, 220, 230. The three power supply modules 31, 32, 33 are of the same type. That is, the voltages which the three power supply modules 31, 32, 33 can respectively provide are equal, and the maximum currents which the three power supply modules 31, 32, 33 can respectively provide are equal. While the three power supply modules 31, 32, 33 are working, the voltages of the three power supply modules 31, 32, 33 are equal, and the currents of the three power supply modules 31, 32, 33 can be respectively changed according to the requirements of the corresponding loads 210, 220, 230. Each power supply module 31, 32, 33 includes a positive electrode 301 and a negative electrode 302, both of which are disposed on a same surface of the power supply module 31, 32, 33.

Figure 2:
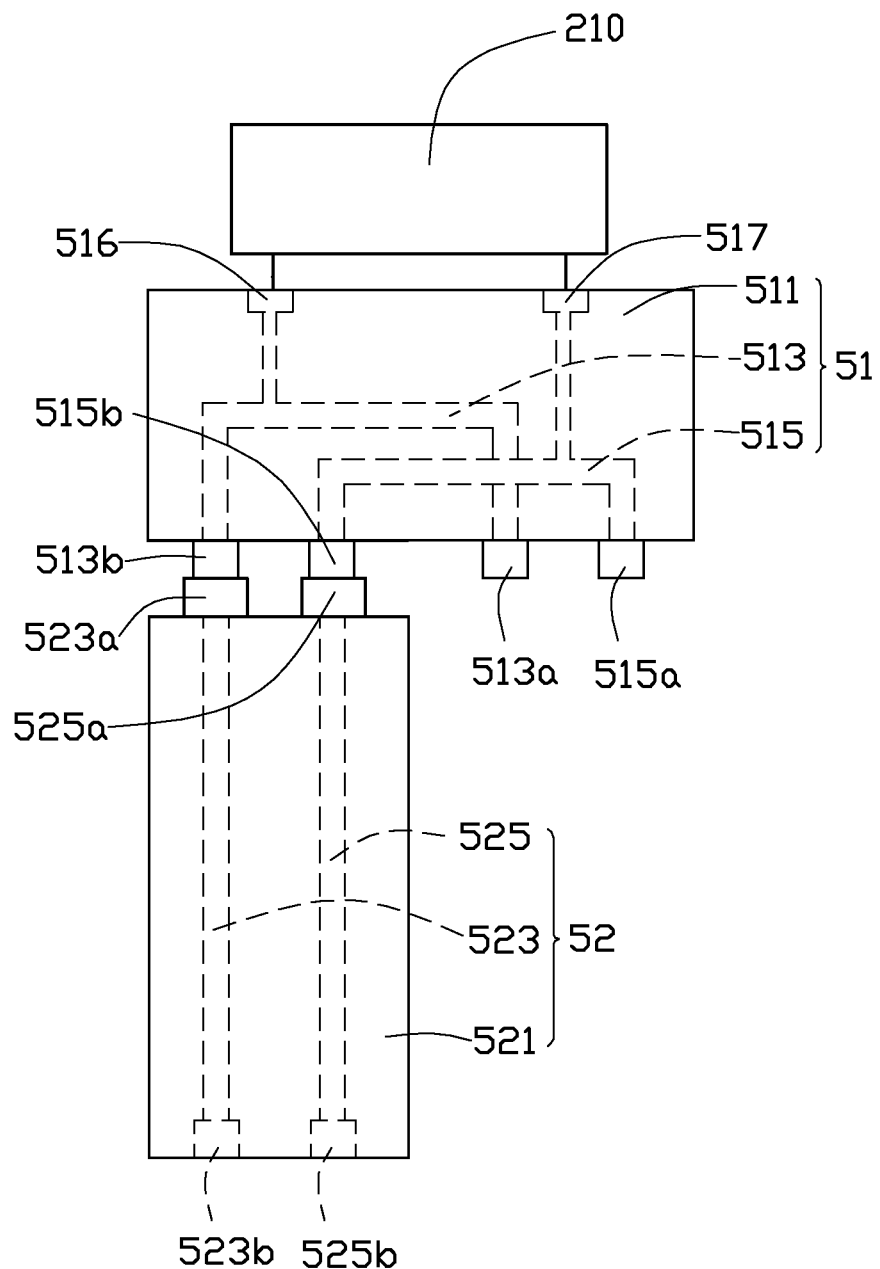
FIG. 2 is a schematic view of a current distribution module of the power supply system of FIG. 1.

The current distribution module 50 is used for connecting the three power supply modules 31, 32, 33 in parallel, and includes three power distribution units 51, three connectors 52, a first wire 56, and a second wire 57. Referring also to FIG. 2, each current distribution unit 51 includes a first fixing plate 511, and a first conductive sheet 513 and a second conductive sheet 515 disposed on the first fixing plate 511. The first conductive sheet 513 includes a first input end 513a and a first output end 513b. The first input end 513a is electrically connected to a corresponding positive electrode 301. The second conductive sheet 515 includes a second input end 515a and a second output end 515b. The second input end 515a is electrically connected to a corresponding negative electrode 302.

Each current distribution unit 51 further includes a positive pad 516 electrically connected to the first conductive sheet 513, and a negative pad 517 electrically connected to the second conductive sheet 515, with both the positive pad 516 and the negative pad 517 fixed on the first fixing plate 511. The positive pad 516 and the negative pad 517 of each power distribution unit 51 are connected to a corresponding load 210, 220, or 230.

Each connector 52 includes a second fixing plate 521, a third conductive sheet 523, and a fourth conductive sheet 525. Both of the third and fourth conductive sheets 523, 525 are fixed on the second fixing plate 521 and are parallel to each other. The third conductive sheet 523 includes a third input end 523a and a third output end 523b. The third input end 523a is electrically connected to the corresponding first output end 513b. The fourth conductive sheet 525 includes a fourth input end 525a and a fourth output end 525b. The fourth input end 525a is electrically connected to the corresponding second output end 515b.

The first wire 56 connects the third output ends 523b to each other. The second wire 57 connects the fourth output ends 525b to each other.

Figure 3:
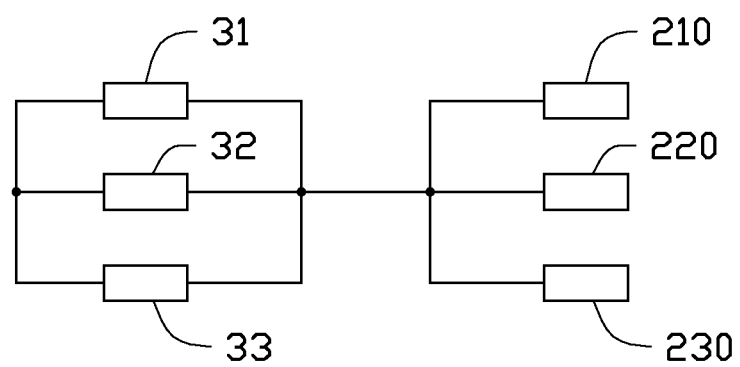
FIG. 3 is an equivalent circuit diagram of the power supply system of FIG. 1.

Referring to FIG. 3, the equivalent circuit diagram of the power supply system 100 shows that the three power supply modules 31, 32, 33 providing current to the three loads 210, 220, 230.

In use, the maximum currents which the first, second, and third power supply modules 31, 32, 33 can provide are 15 A (amps), 15 A, and 15 A respectively. When the first, second, and third loads 210, 220, 230 are working normally, the required currents thereof are 10 A, 8 A, and 6 A respectively. At this time, the currents provided by the first, second and third power supply modules 31, 32, 33 are 10 A, 8 A, and 6 A respectively. If the required current of the first load 210 increases to 18 A, the first power supply module 31 will provide 15 A current to the first load 210. At the same time, the second power supply module 32 will provide 10 A current, of which 8 A current is distributed to the second load 220 and 2 A current is distributed to the first load 210; and the third power supply module 33 will provide 7 A current, of which 6 A current is distributed to the third load 330 and 1 A current is distributed to the first load 310. Thus, the first load 310 can obtain the needed 18 A current to work normally.

In other embodiments, the connector 52 can be omitted. In such cases, the first wire 56 connects all of the first output ends 513b to each other, and the second wire 57 connects all of the second output ends 515b to each other.

In still other embodiments, both the current distribution units 51 and the connectors 52 can be omitted. In such cases, the first wire 56 connects all of the positive electrodes 301 to each other, and the second wire 57 connects all of the negative electrodes 302 to each other.

It will be understood that the above particular embodiments are shown and described by way of illustration only. The principles and the features of the present disclosure may be employed in various and numerous embodiments thereof without departing from the scope of the invention as claimed. The above-described embodiments illustrate the scope of the disclosure but do not restrict the scope of the disclosure.

What is claimed is:

1. A power supply system for use in a rack server to supply power to a plurality of loads, the power supply system comprising:
    a plurality of plugs configured for connecting to an external power source to obtain alternating current;
    a plurality of power supply modules connected to the respective plugs and configured for converting the alternating current to direct current and providing the direct current to the respective loads according to the requirements of the respective loads, each power supply module comprising a positive electrode and a negative electrode, with both the positive electrode and the negative electrode connect to a corresponding load; and
    a current distribution module configured for connecting the positive electrodes to each other and connecting the negative electrodes to each other, such that the power supply modules are connected in parallel.

2. The power supply system of claim 1, wherein the current distribution module comprises a first wire and a second wire, the first wire is configured for connecting the positive electrodes to each other, and the second wire is configured for connecting the negative electrodes to each other.

3. The power supply system of claim 1, wherein the current distribution module comprises a plurality of current distribution units, a first wire, and a second wire, each of the current distribution units comprises a first fixing plate, and a first conductive sheet and a second conductive sheet both disposed on the first fixing plate, the first conductive plate comprises a first input end electrically connected to a corresponding positive electrode and a first output end, the second conductive plate comprises a second input end electrically connected to a corresponding negative electrode and a second output end, the first wire is configured for connecting the first output ends to each other, and the second wire is configured for connecting the second output ends to each other.

4. The power supply system of claim 3, wherein the current distribution module further comprises a plurality of connectors corresponding to the current distribution units, each connector comprises a second fixing plate, a third conductive sheet, and a fourth conductive sheet, with both the third conductive sheet and the fourth conductive sheet fixed on the second fixing plate, the third conductive sheet is configured for connecting a corresponding first output end to the first wire, and the fourth conductive sheet is configured for connecting a corresponding second output end to the second wire.

5. The power supply system of claim 1, wherein the positive electrode and the negative electrode of each power supply module are disposed on a same surface of the power supply module.

6. A rack server comprising:
    a plurality of loads; and
    a power supply system for supplying power to the loads, and comprising:
        a plurality of plugs configured for connecting to an external power source to obtain alternating current;
        a plurality of power supply modules connected to the respective plugs and configured for converting the alternating current to direct current and providing the direct current to the respective loads according to the requirements of the respective loads, each power supply module comprising a positive electrode and a negative electrode, with both the positive electrode and the negative electrode connect to a corresponding load; and
        a current distribution module configured for connecting the positive electrodes to each other and connecting the negative electrodes to each other, such that the power supply modules are connected in parallel.

7. The rack server of claim 6, wherein the current distribution module comprises a first wire and a second wire, the first wire is configured for connecting the positive electrodes to each other, and the second wire is configured for connecting the negative electrodes to each other.

8. The rack server of claim 6, wherein the current distribution module comprises a plurality of current distribution units, a first wire, and a second wire, each of the current distribution units comprises a first fixing plate, and a first conductive sheet and a second conductive sheet, both disposed on the first fixing plate, the first conductive plate comprises a first input end electrically connected to a corresponding positive electrode and a first output end, the second conductive plate comprises a second input end electrically connected to a corresponding negative electrode and a second output end, the first wire is configured for connecting the first output ends to each other, and the second wire is used for connecting the second output ends to each other.

9. The rack server of claim 8, wherein the current distribution module further comprises a plurality of connectors corresponding to the current distribution units, each connector comprises a second fixing plate, a third conductive sheet, and a fourth conductive sheet, with both the third conductive sheet and the fourth conductive sheet fixed on the second fixing plate, the third conductive sheet is configured for connecting a corresponding first output end to the first wire, and the fourth conductive sheet is configured for connecting a corresponding second output end to the second wire.

10. The rack server of claim 6, wherein the positive electrode and the negative electrode of each power supply module are disposed on a same surface of the power supply module.

11. The rack server of claim 6, wherein the loads are blade servers.

* * * * *